United States Patent [19]

Howlett

[11] Patent Number: 5,718,857
[45] Date of Patent: Feb. 17, 1998

[54] PROCESS FOR FORMING SOLID AGGREGATES INCLUDING SHAPED ARTICLES

[75] Inventor: John Cavill Howlett, Cheltenham, Australia

[73] Assignee: Ferrock Corporation (Australia) Pty. Ltd., Hornsby, Australia

[21] Appl. No.: 758,512

[22] Filed: Dec. 2, 1996

Related U.S. Application Data

[63] Continuation of Ser. No. 162,123, filed as PCT/AU92/00283, Feb. 14, 1994, abandoned.

[30] Foreign Application Priority Data

Jun. 12, 1991 [AU] Australia ................ PK6642

[51] Int. Cl.⁶ .................................. B29C 59/00
[52] U.S. Cl. .................. 264/122; 264/45.1; 264/49; 264/25; 264/66; 428/202
[58] Field of Search .................. 428/202, DIG. 2, 428/45.1, 49, 25, 66, 122; 106/71, 74, 76, 89, 97, 109, 110, 111, 117, 118, 120; 404/75, 76; 405/129, 128, 263, 264, 265, 266; 210/710

[56] References Cited

U.S. PATENT DOCUMENTS

| | | |
|---|---|---|
| 4,113,843 | 9/1978 | Mirsky et al. . |
| 4,404,105 | 9/1983 | Rysman de Lockerente et al. 210/710 |
| 4,741,776 | 5/1988 | Bye et al. .............. 106/89 |

FOREIGN PATENT DOCUMENTS

| | | |
|---|---|---|
| 535130 | 4/1981 | Australia . |
| 2106810 | 5/1972 | France . |
| 2320266 | 4/1977 | France . |
| 54-090323 | 7/1979 | Japan . |
| 1014814 | 4/1983 | U.S.S.R. . |
| 1548178 | 3/1990 | U.S.S.R. . |
| 1629277 | 2/1991 | U.S.S.R. . |
| 1629278 | 2/1991 | U.S.S.R. . |
| 1500668 | 2/1978 | United Kingdom . |

OTHER PUBLICATIONS

"Binders comprising Class F fly ash and an alkali metal compound, and manufacture of artifacts with these binders", Gladstone, et al., *Chemical Abstracts*, vol. 117, No. 2, Jul. 13, 1992, Columbus, Ohio.

"Concrete mixture", Krivorotov et al., *Chemical Abstracts*, vol. 93, No. 2, Jul. 14, 1980, Columbus, Ohio.

"Pressing noncompact moist mixtures into closed forms by stamping", Laznicka, *Chemical Abstracts*, vol. 98, No. 12, Mar. 21, 1983, Columbus, Ohio.

*Primary Examiner*—Merrick Dixon
*Attorney, Agent, or Firm*—Lowe, Price, LeBlanc & Becker

[57] ABSTRACT

A process for the preparation of solid aggregate materials is disclosed. This process makes use of an aluminosilicate containing non-soft or waste material in combination with iron oxide, an alkali, a water soluble silicate and water to produce a mixture which is subsequently formed into a cohesive mass and then allowed to cure until the solid aggregate material is formed. The process is useful for both the production of low compressive strength materials such as landfill and high compressive strength materials such as bricks. As curable aluminosilicate containing materials includes fly ash, the process provides a means by which substantial amounts of such materials may be converted into a useful form.

20 Claims, No Drawings

5,718,857

PROCESS FOR FORMING SOLID AGGREGATES INCLUDING SHAPED ARTICLES

This application is a continuation of application Ser. No. 08/162,123 filed Feb. 14, 1994, now abandoned, which was filed as PCT International Application PCT/AU92/00283 filed Jun. 12, 1992.

TECHNICAL FIELD

This invention relates to a process for the preparation of shaped articles such as construction materials, pavers and the like, in particular to a process that utilises waste and other materials such as fly ash in amounts that may constitute a major proportion of the shaped articles.

The invention also relates to a process for the disposal of particulate waste materials such as fly ash whereby these materials are converted into a solid aggregate.

BACKGROUND ART

In the generation of electricity using black coal-fired burners, enormous amounts of fly ash are generated. Whilst potentially the fly ash could be allowed to escape to the atmosphere, in order to reduce the polluting effects that this would cause, measures are undertaken to ensure that as much fly ash as possible is prevented from entering the atmosphere. The fly ash generated in this way is in fine particulate form and is therefore difficult to store. However, because of the large amounts of fly ash that are generated, the continued retention and storage of further amounts of fly ash is problematic.

Accordingly it has been proposed to deal with this problem by using the fly ash in a variety of applications including land fill and the like where essentially no or minimal processing of the fly ash is required prior to use. Such applications are not however without their shortcomings, particularly in those circumstances where the fly ash contains significant levels of potentially toxic substances such as selenium.

The prior art has recognised the existence of the enormous amounts of fly ash and has sought ways of utilising or disposing of the fly ash in a satisfactory manner through processing. Some proposals along these lines disclose the formation of aggregates and other materials whereby typically a polymeric binder or a cement is mixed with the fly ash. To the best of the present inventor's knowledge, these proposals suffer from the disadvantage that either relatively small proportions of fly ash can be used, or substantial heating is required, or the cost of the binders/cement results in an expensive product. Furthermore, it would seem that if the prior art were used to form the fly ash into a construction material, either the material would be excessively expensive or the proportion of fly ash in the construction material would be so low as to not constitute a satisfactory means of disposing of fly ash.

One example of a process for forming a construction material that indirectly uses fly ash is described in Australian patent 535130. In this process, a construction material is formed from a mixture of a soil that has been heated in a manner such that the property of the soil to swell with changing levels of moisture is destroyed without melting any of the soil constituents, with iron oxide which is added either before or after heating and into which a solution of sodium silicate is added. On page 4, lines 10–16, it is taught that the sodium silicate solution may be formed by admixing fly ash and sodium hydroxide. This use is of course indirect as the fly ash is merely used to form sodium silicate. Although no express limitations are given in the patent as to the maximum amount of fly ash that can be indirectly incorporated, on page 3 lines 5–7, sodium silicate and iron oxide are said to be preferably included in amounts from 1 to 20% by weight of the total mixture. In fact there is no exemplification of the use of fly ash, the only relevant guidance being that either 2.5% or 5% by weight of sodium silicate is used.

DISCLOSURE OF THE INVENTION

The present inventor has recognised that there exists a need for a process that is capable of utilising substantial amounts of fly ash and like materials in a manner that would not only facilitate disposal but would turn the fly ash into a useful form.

Accordingly, in a first aspect the present invention consists in a process for the preparation of a solid aggregate material comprising:
   a) preparing a mixture of an aluminosilicate containing non-soil or waste material to contain, iron oxide, an alkali, a water soluble silicate, water and optional additives excluding binders;
   b) forming the mixture into a cohesive mass; and
   c) curing the mass whereby a solid aggregate material is formed.

In a further aspect, this invention consists in a solid aggregate material made by a process according to the present invention.

In one form of the invention, the solid aggregate material may comprise a shaped article. This process requires that the step of forming the mixture into a cohesive mass comprise formation of the mixture into a shaped article. The subsequent curing step will be carried out in a manner such that the shaped article will attain a requisite strength.

In another form of the invention, the solid aggregate may have a minimal compressive strength in which case the curing step will generally comprise air drying until a solid aggregate is formed. Such a process is particularly useful for the disposal of particulate aluminosilicate containing waste materials.

Given that the process in Australian patent 535130 has as an essential feature the use of a particularly prepared soil which is not essential in the present invention, and there is no suggestion or teaching to include fly ash per se or more particularly a water soluble silicate and fly ash, it is evident that the present invention represents a fundamentally different process.

The present inventor believes that, without being bound by theory, in the process of the present invention an iron aluminosilicate crystal structure is formed which imparts relatively high strength to the resultant shaped articles.

The aluminosilicate containing non-soil or waste material may comprise a variety of materials including fly ash, metropolitan waste ash, sewerage ash, other flue ashes, coal wash tailings, mineral tailings, scoria, obsidian, other pozzolanic materials and neutral to slightly acidic slags.

In most cases, the material will be in particulate form, usually relatively fine particles.

An amount of up to about 95% by weight of the aluminosilicate material may be included in the mixture thereby providing for the possibility of both disposing of and utilising substantial amounts of fly ash.

The amount of iron oxide used may be as low as about 1% by weight with respect to the aluminosilicate containing material. At levels up to about 7% compressive strength increases but above that level compressive strength remains substantially constant. Thus, the aluminosilicate containing material may comprise a material such as a flue dust high in iron oxide without being detrimental to the strength of shaped articles formed from such materials.

In addition, some aluminosilicate materials may inherently contain sufficient iron oxide to circumvent the need to add iron oxide when preparing the mixture. An example of such materials are particular ashes.

A similar minimum level of water soluble silicate may be used as to iron oxide. In this case levels above about 10% do not result in further increases in compressive strength.

Given a particular aluminosilicate containing material, the person skilled in the art could readily determine appropriate amounts of each to give a shaped article of a required compressive strength.

It has been found that the amount of alkali used is not critical in that levels as low as 0.9% by weight with respect to the aluminosilicate containing material have yielded shaped articles of acceptable compressive strength. Desirably, however, the alkali will be a strong alkali such as sodium or potassium hydroxide.

By contrast, it would appear that the level of silicate used relative to the aluminosilicate containing material is an important factor in determining compressive strength. A minimum of at least about 5% by weight of silicate will generally be required.

To a certain extent, the amount of water incorporated in the mixture will depend upon the manner in which the shaped article is to be formed. An amount of water equivalent to at least about 10% by weight of the aluminosilicate containing material will usually be sufficient in forming the majority of shaped articles.

A variety of additives, excluding binders, may be included in the mixture in amounts up to about three times the weight of aluminosilicate containing material. These additives including appropriately graded gravel, sand, pigments and calcined soils. Usually such additives will be included to produce a shaped article having a particularly desired texture, colour or appearance.

Once the mixture of the aluminosilicate containing material, iron oxide, alkali, water and optional additives has been prepared, it may be formed into a variety of shaped articles by compaction, moulding, extruding or slip forming. The method of formation will be largely determined by the composition of the mixture and the nature of the finished shaped article. In this regard it should be noted that a variety of shaped articles may be formed using this invention including tiles, pavers and construction materials such as bricks, blocks and the like.

Once the shaped article is formed, it may be allowed to cure in ambient air at a temperature of about 20°–40° C. Under these conditions, curing will normally be completed in about 7 days.

As no heating is required in the formation of the shaped articles of the invention of the kind that it required in the formation of conventional clay bricks and tiles, the energy requirements of the invention are quite low, thereby contributing to the relatively low cost of these shaped articles.

It has, however, been found that it is possible to substantially accelerate the curing time by increasing the curing temperature, for example, by curing at 100° C. in a confined environment.

Similarly, given that the cost of fly ash and like materials is virtually nil and the cost of other ingredients in the mixture is relatively low, it will be appreciated that the cost of production of the shaped articles of the invention will also be relatively low.

In a particularly preferred embodiment, the present invention comprises shaped articles in the form of bricks which comply with Australian Standard AS1226-1984 for clay bricks or AS2733-1984 for concrete masonry units.

It will, however, be appreciated by those skilled in the art, that in the disposal process of the invention there is a minimal requirement in some cases for the strength of the solid aggregate material produced. Thus, the aggregate material may well be used as landfill, in which case the only requirement is that the particulate matter be bound sufficiently in the aggregate so as to prevent it from being blown away through wind action.

MODES FOR CARRYING OUT THE INVENTION

In order to better understand the nature of the invention, a number of examples will now be described. In each case, the ingredients stated were mixed until homogenous and the mixture formed into compacts and allowed to air cure at ambient temperature. Compressive strengths were assessed at 7 and 28 days. Results are set out in the table below. It should be noted that examples 10 and 12 are comparative and all examples included fly ash. Example 11 which had no iron oxide added included about 1-2% in the fly ash used.

TABLE

| | % by weight relative to fly ash 100% | | | | Compressive Strength (mPa) | |
|---|---|---|---|---|---|---|
| Example | Iron Oxide | NaOH | Sodium Silicate | Water | 7-day | 28-day |
| 1 | 5.0 | 2.5 | 5.0 | 10.0 | 13 | 14 |
| 2 | 5.0 | 2.5 | 5.0 | 10.0 | 13 | 18 |
| 3 | 5.0 | 2.5 | 10.0 | 18.0 | 15 | 23 |
| 4 | 5.0 | 2.5 | 10.0 | 17.0 | 14 | 28 |
| 5 | 5.0 | 2.5 | 10.0 | 18.0 | 30 | 44 |
| 6 | 5.0 | 2.5 | 10.0 | 18.0 | 17 | 18 |
| 7 | 5.0 | 1.25 | 7.5 | 12.5 | 18 | 19 |
| 8 | 5.0 | 2.5 | 5.0 | 14.0 | 15 | 20 |
| 9 | 5.0 | 1.25 | 10.0 | 17.0 | 23 | 28 |
| *10 | 5.0 | 2.5 | 0 | 30.0 | 4 | 5 |
| 11 | 0 | 2.5 | 5.0 | 30.0 | 10 | 12 |
| *12 | 5.0 | 0 | 5.0 | 13.0 | 8 | 9 |

*Comparative

From these results it is evident that high strength shaped articles may be formed using the invention whilst incorporating substantially high levels of a waste material such as fly ash.

Whilst this invention has been described with reference to certain preferred embodiments and examples, it will be appreciated by those skilled in the art that numerous variations and modifications are possible without departing from the spirit or scope of the invention as broadly described.

I claim:

1. A process for the preparation of a solid aggregate material comprising:
   a) preparing a solid mixture consisting essentially of particulate aluminosilicate containing non-soil material, an iron oxide component, an alkali, a water soluble silicate and water;
   b) shaping the solid mixture into a shaped article through the application of a predetermined force; and
   c) curing the shaped article whereby a solid aggregate shaped article is formed; wherein the aluminosilicate containing non-soil material is selected from the group consisting of fly-ash, metropolitan waste ash, sewerage ash, other flue ashes, coal wash tailings, scoria and neutral to slightly acidic slags.

2. The process as claimed in claim 1 wherein the aluminosilicate containing non-soil material is fly-ash.

3. The process as claimed in claim 2 wherein the aluminosilicate containing non-soil material is in particulate form.

4. The process as claimed in claim 3 wherein the iron oxide component is derived from the aluminosilicate containing non-soil material.

5. The process as claimed in claim 4 wherein up to about 95% by weight of the mixture comprises the aluminosilicate containing non-soil material.

6. The process as claimed in claim 5 wherein the shaped article is cured until the shaped article attains a requisite compressive strength.

7. The process as claimed in claim 6 wherein the mixture includes, with respect to the aluminosilicate containing non-soil material, about 1% by weight or more of the iron oxide component.

8. The process as claimed in claim 7 wherein the mixture includes, with respect to the aluminosilicate containing non-soil material, about 1% by weight or more of the water soluble silicate.

9. The process as claimed in claim 8 wherein the mixture includes, with respect to the aluminosilicate containing non-soil material, about 5% by weight or more of the water soluble silicate.

10. The process as claimed in claim 9 wherein the mixture includes, with respect to the aluminosilicate containing non-soil material, about 0.9% by weight or more of the alkali.

11. The process as claimed in claim 10 wherein the alkali is one of sodium hydroxide and potassium hydroxide.

12. The process as claimed in claim 11 wherein the mixture includes, with respect to the aluminosilicate containing non-soil material, about 10% by weight or more of the water.

13. The process as claimed in claim 12 wherein the mixture includes one or more additives selected from the group consisting of gravel, sand, pigments and calcined solid.

14. The process as claimed in claim 13 wherein the shaped article is formed by compaction, moulding, extrusion or slip forming.

15. The process as claimed in claim 14 wherein curing is effected in ambient air.

16. The process as claimed in claim 15 wherein curing is effected at an elevated temperature within a confined environment.

17. The process as claimed in claim 16 wherein the temperature is about 100° C.

18. The process as claimed in claim 15 wherein the ambient air is at a temperature between 20° and 40° C.

19. The process as claimed in claim 1 wherein the steps of preparing, forming and curing are performed in the absence of a binder.

20. The process as claimed in claim 1 wherein the iron oxide component is separate from said aluminosilicate containing non-soil material.

* * * * *